June 11, 1929.　　W. R. RONEMOUS　　1,716,979
ICE ELEVATOR
Filed Dec. 16, 1927　　4 Sheets-Sheet 1

Inventor,
W. R. Ronemous.

By

Attorney

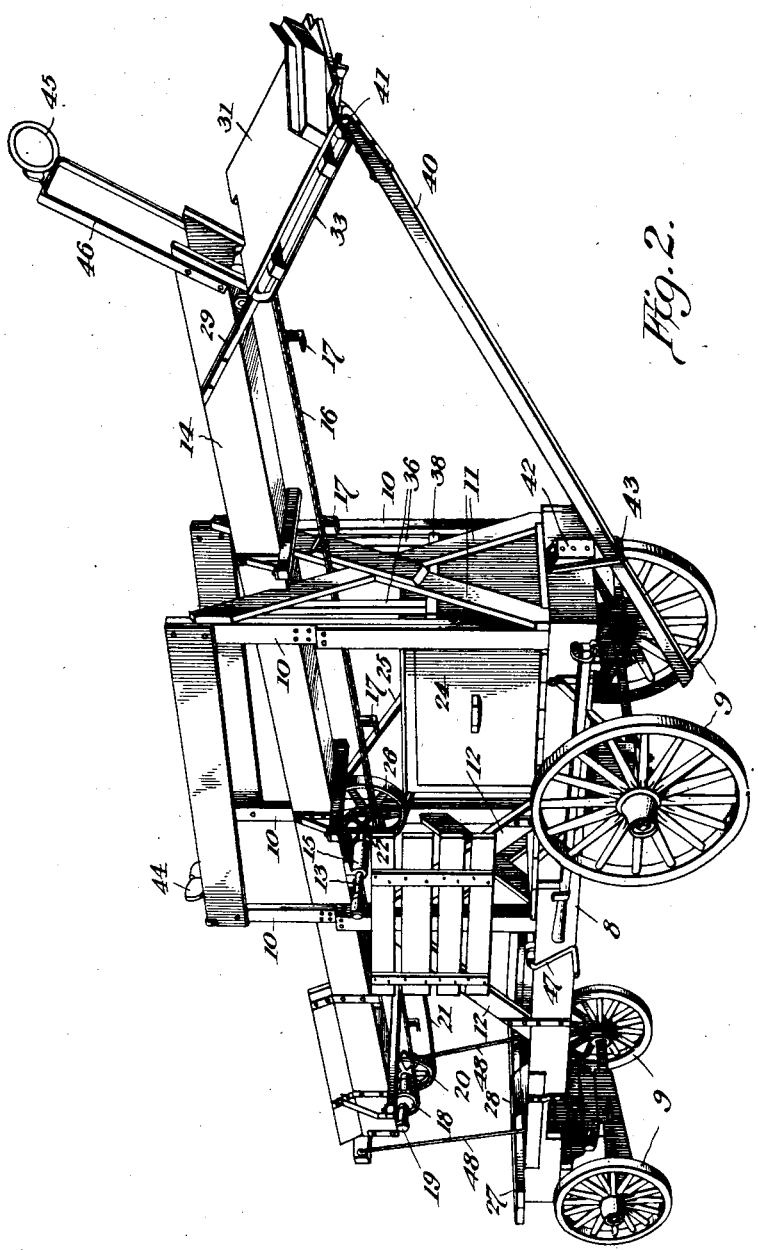

June 11, 1929.  W. R. RONEMOUS  1,716,979
ICE ELEVATOR
Filed Dec. 16, 1927    4 Sheets-Sheet 3
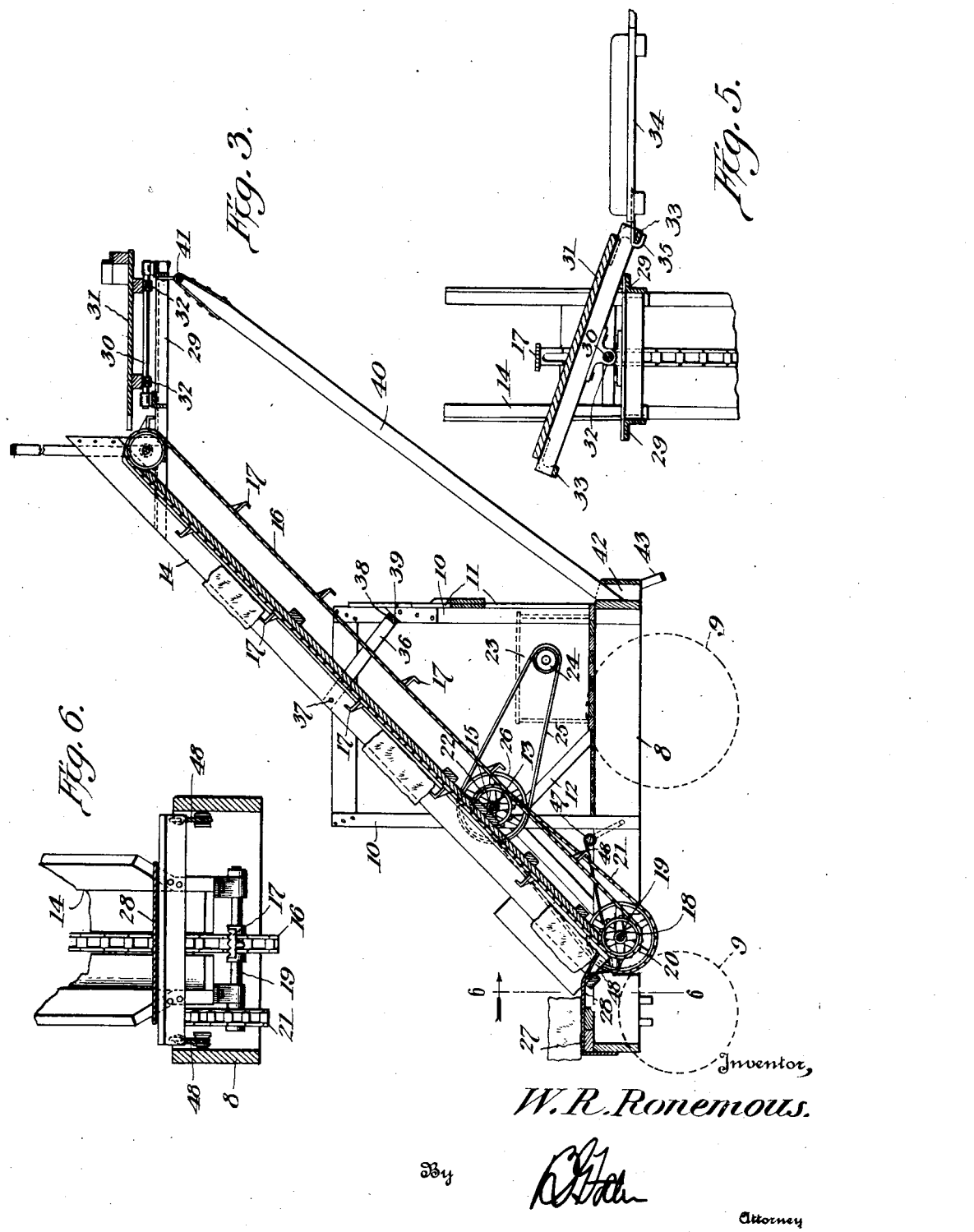
Inventor,
W. R. Ronemous.
By
Attorney June 11, 1929.  W. R. RONEMOUS  1,716,979
ICE ELEVATOR
Filed Dec. 16, 1927  4 Sheets-Sheet 4
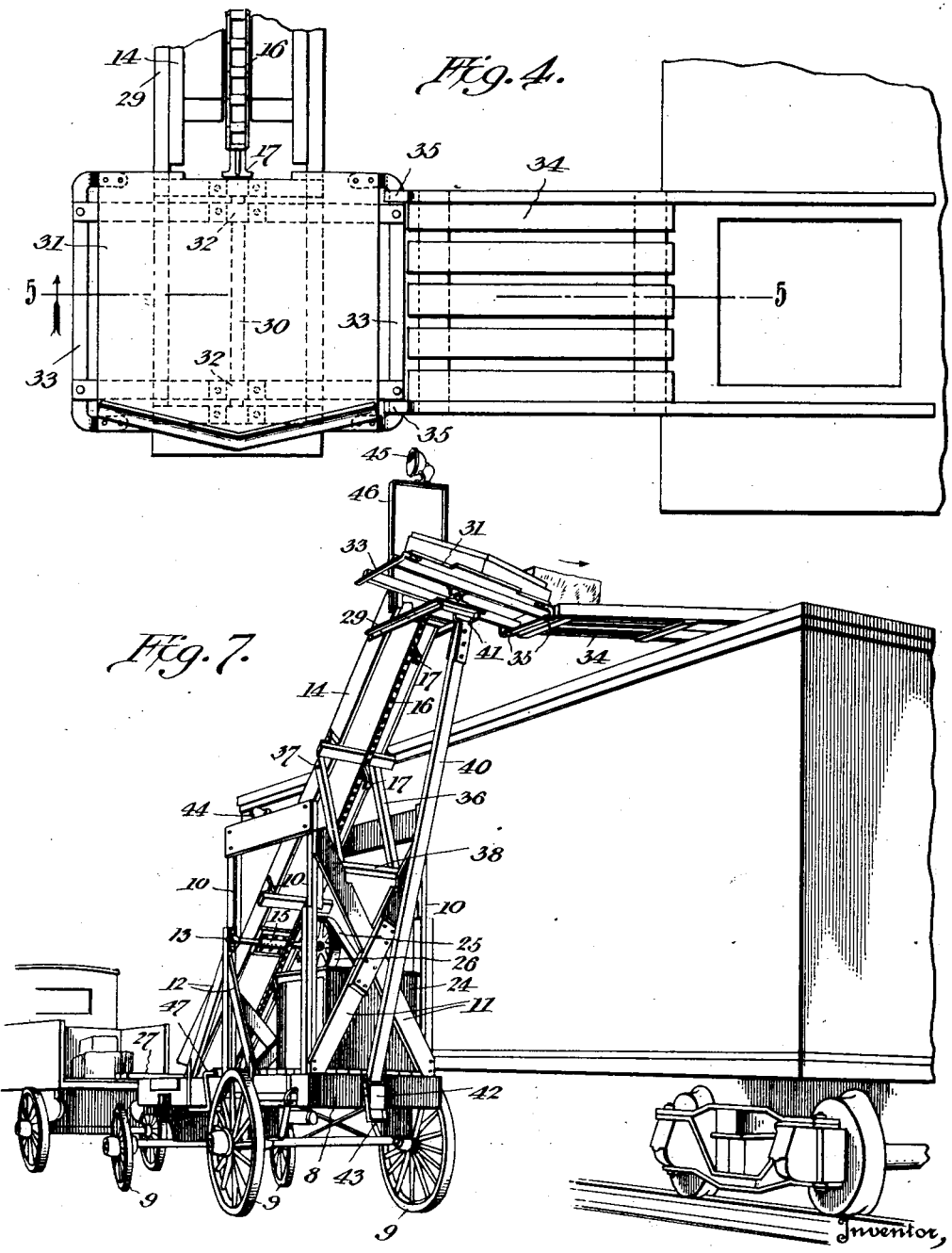
W. R. Ronemous.

Patented June 11, 1929.

1,716,979

UNITED STATES PATENT OFFICE.

WALTER R. RONEMOUS, OF CHARLESTON, SOUTH CAROLINA.

ICE ELEVATOR.

Application filed December 16, 1927. Serial No. 240,449.

The present invention relates to portable elevators, and is particularly designed for elevating ice to refrigerator cars. Obviously, however, it is not limited to this particular use.

The object is to provide an effective apparatus of a relatively simple character that will elevate blocks of ice or other material and deliver them in either of opposite directions at its upper end, the mechanism being such that it can be lowered so as to be readily transportable from place to place without material interference.

In the accompanying drawings:—

Figure 2 is a similar view, but showing the elevator depressed and the apparatus in condition for movement from place to place.

Figure 3 is a vertical longitudinal sectional view through the structure as illustrated in Figure 1.

Figure 4 is a top plan view of the upper end of the mechanism showing the receiving platform and chute.

Figure 5 is a detail sectional view on the line 5—5 of Figure 4,

Figure 6 is a detail sectional view through the loading platform taken on the line 6—6 of Figure 3, Figure 7 is a perspective view showing the elevator in position to deliver ice to a car, and with the service truck supplying the ice to the elevator.

Figure 1:
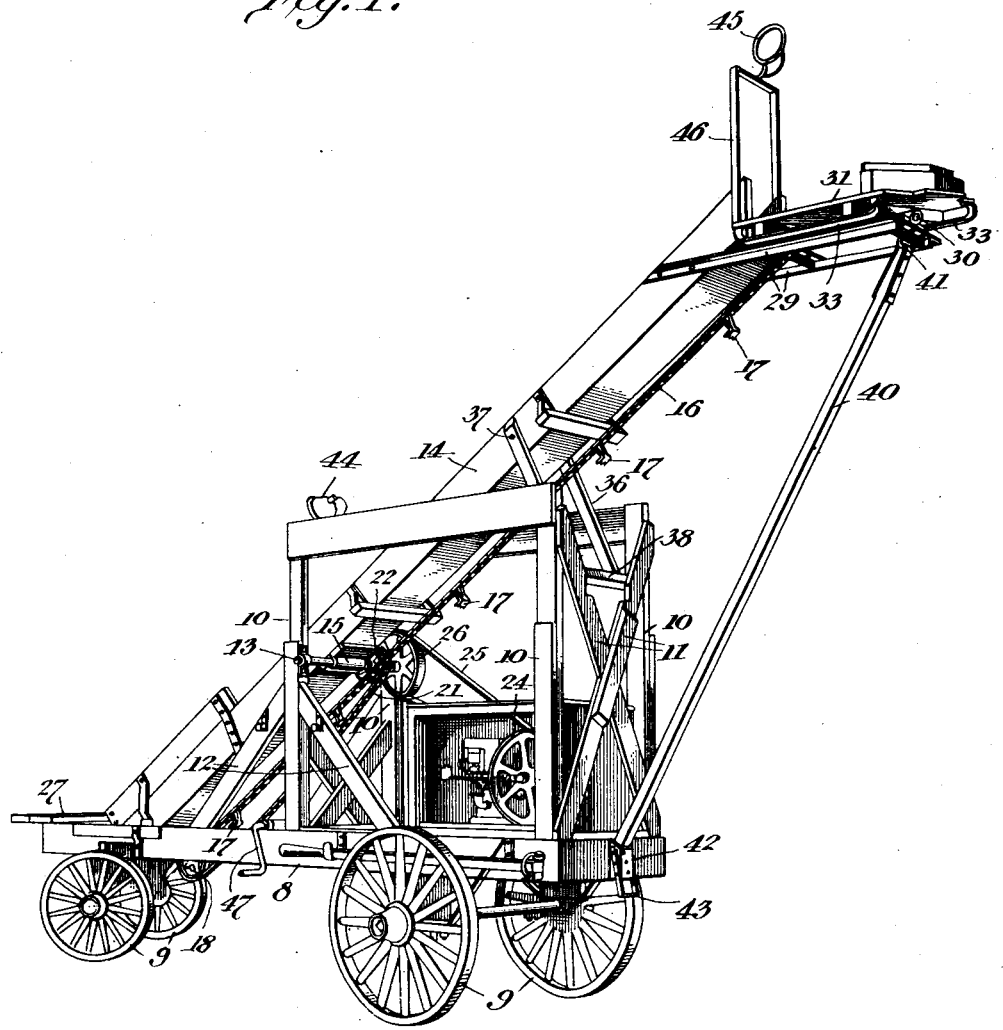
Figure 1 is a perspective view of the preferred embodiment of the invention, showing it in its elevated or operative condition.

The structure is shown in the form of a vehicle, comprising a body frame 8 mounted on vehicle wheels 9 and carrying at one end an elevated frame. This elevated frame consists of two rear and two front standards 10, the rear standards being connected by crossed braces 11 and the front standards being also suitably braced, as shown at 12. On said front standards there is journaled a drive shaft 13, and this shaft constitutes a pivotal mounting for an inclined chute 14, a box 15 being mounted on the bottom of said chute and encircling the shaft 13.

In this chute operates an endless elevator member, preferably comprising an endless chain 16 having dogs 17, the upper stretch of the chain, as clearly shown in Figure 3, moving upwardly in the chute, and as illustrated in Figure 6 operating preferably in the center thereof. The said chain 16 passes around a suitable sprocket wheel 18 carried by a shaft 19 journaled on the underside of the lower end of the chute, and this shaft is provided with another sprocket wheel 20. The sprocket wheel 20 is engaged by a driving sprocket chain 21 that passes around a sprocket wheel 22 on the main driving shaft 13. A motor, designated generally by the reference numeral 23, is mounted within the elevated frame and its drive pulley 24 is engaged by a belt 25 operating around a drive pulley 26 on the driving shaft 13. Thereby the elevator is operated.

On the front end of the body frame 8 and at the lower end of the chute 14 there is a loading platform 27 which may be provided with a suitable flexible apron 28. The upper end of the chute carries a substantially horizontal preferably U-shaped frame 29, and mounted centrally thereof and longitudinally of the central plane of the apparatus is a pivot rod 30. A receiving platform 31 is pivotally mounted, as shown at 32 on this rod, and is thus capable of swinging laterally in either direction, its swinging movement, however, being limited by the bars of the frame 29 beneath it. The platform is provided with hanger bars 33 fixed to its opposite sides. A slideway 34 is provided at one end with hanger hooks 35 that are adapted to engage either of said bars 33, accordingly as the slideway is placed on one or the other side of the platform.

In order to support the chute in its upper or operative inclined position, standards 36 are pivoted, as shown at 37 to opposite sides of the same above the drive shaft 13, these standards being connected by a lower cross bar 38 and the frame thus formed being adapted to rest against suitable supports 39 on the rear standards 10. Another standard 40 is pivoted at its upper end and as shown at 41 to the outer end of the receiving platform supporting frame 29, its lower end being adapted to detachably engage in a socket member 42 fixed to the rear end of the body frame 8. A hanger loop 43 is secured to the socket member 42 and is adapted to slidably receive the lower portion of the standard 40 when the elevator is folded or lowered for transportation, as shown in Figure 2.

Preferably a lamp, as 44, is mounted on the front end of the elevated frame for illuminating the loading platform, and the receiving platform may be illuminated by a lamp 45 mounted on a supporting frame 46 carried by the upper end of the chute.

In using this apparatus for icing cars, as shown in Figure 7, it is drawn up alongside the car and the slideway 34 is placed on the car with its open end above the ice-receiving door, the said slideway being hooked on the adjacent side of the receiving platform 31. The consequence is that said platform will tilt to a downward inclination toward the car. A supply truck is then backed up to the loading platform 27, the engine 23 is operated, and the ice slid on to said platform and thence into the chute where it is caught by the dogs 17, carried up and delivered on to the receiving platform 31. From this it will gravitate on to the slideway and thence move or be moved by an operator to the car. Obviously the apparatus can be placed on the opposite side of the car, in which case the slideway is engaged on the opposite side of the receiving platform, causing it to tilt in the opposite direction. When it is desired to transport the apparatus it is only necessary to disengage the standards 36 and 40 from their seats, whereupon the chute will swing downwardly on the drive shaft 13 as an axis to a lower position, so that it can be moved from place to place without interfering with overhead wires or other elevated obstructions. Preferably there is provided a windlass 47 mounted on the body frame and a cable 48 that winds on said windlass and is attached to the lower end of the chute, thereby providing convenient means for elevating the chute.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In a portable conveyor, the combination with a vehicular body having an elevated portion, of a drive shaft journaled on the elevated portion, a motor on the body geared to the shaft for driving it, an elevator guideway pivoted between its ends on the shaft and having an elevated delivery end portion extending over the motor and a depressed receiving end portion at one side of the same, conveyor shafts journaled on said end portions on opposite sides of the drive shaft, an endless conveyor that passes around the conveyor shafts, gearing connecting the drive shaft and one of the conveyor shafts and permitting the swinging of the elevator guideway on the latter, and means for supporting the elevator guideway in elevated position and permitting its being swung downwardly for transportation.

2. In a portable conveyor, the combination with a vehicular body having an elevated portion and a loading platform at one side of the same, of a drive shaft journaled on the elevated portion, a motor on the body geared to the shaft for driving it, an elevator guideway pivoted between its ends on the shaft and having an elevated delivery end portion extending over the motor and a depressed receiving end portion at one side of the same that is adjacent to the platform when the other end is elevated and rises above it when said other end is depressed, conveyor shafts journaled on said end portions on opposite sides of the drive shaft, an endless conveyor that passes around the conveyor shafts, gearing connecting the drive shaft and one of the conveyor shafts and permitting the swinging of the elevator guideway on the latter, a support pivoted to the upper end of the elevator guideway, a seat on the vehicular body that detachably receives the lower end of the support, and a hanger loop on said body for slidably receiving and holding the support when detached from the seat.

3. In a portable conveyor, the combination with an elevator chute and an elevating conveyor operating thereon, of a fixed frame extending outwardly from the upper end of the chute, and a receiving platform pivoted on the frame and tiltable laterally of the chute in either of opposite directions, the tilting movement of platform being limited by portions of the frame on opposite sides of the platform's pivot axis, the opposite margins of the platform having means for detachable engagement with a slideway, and a slideway having means for detachable engagement with said means, to hold the platform in depressed position and constituting an extension thereof.

4. In a portable conveyor, the combination with an elevator chute and an elevating conveyor operating thereon, of a fixed frame extending outwardly from the upper end of the chute, including spaced bars outstanding from the chute, a pivot member extending longitudinally of and between the bars, and a platform pivoted to swing with the pivot member as an axis and have its swinging movement limited by the side bars, the margins of the platform projecting beyond the side bars having hanger bars beyond the side bars, and a slideway having hooks for detachably engaging said hanger bars and pivotally mounting the slideway from the platform.

In testimony whereof, I affix my signature.

WALTER R. RONEMOUS.